United States Patent [19]

Pfeil et al.

[11] Patent Number: 5,612,394

[45] Date of Patent: Mar. 18, 1997

[54] AQUEOUS, MODIFIED EPOXY RESIN DISPERSIONS

[75] Inventors: Armin Pfeil; Michael Hoenel; Paul Oberressl; Dieter Dreischhoff, all of Wiesbaden; Stefan Petri, Taunusstein, all of Germany

[73] Assignee: Hoechst Aktiengesellschaft, Frankfurt am Main, Germany

[21] Appl. No.: 253,077

[22] Filed: Jun. 2, 1994

[30] Foreign Application Priority Data

Aug. 16, 1993 [DE] Germany .......................... 43 27 493.5

[51] Int. Cl.$^6$ .......................... C08K 3/20; C08L 63/00
[52] U.S. Cl. .......................... 523/403; 523/406; 523/423; 525/524; 525/529; 525/530; 525/531; 525/532; 525/533
[58] Field of Search ..................... 523/403, 406, 523/423; 525/524, 529, 530, 531, 533, 532

[56] References Cited

U.S. PATENT DOCUMENTS

| | | | |
|---|---|---|---|
| 4,285,847 | 8/1981 | Ting | 260/29.2 |
| 4,302,373 | 11/1981 | Steinmetz | 260/29.3 |
| 4,331,574 | 5/1982 | Bekooij et al. | 525/530 |
| 4,415,682 | 11/1983 | Becker | 523/403 |
| 4,423,201 | 12/1983 | Hicks | 528/76 |
| 4,446,256 | 5/1984 | Hicks | 523/402 |
| 4,522,962 | 6/1985 | Abbey et al. | 523/410 |
| 4,539,378 | 9/1985 | Cuscurida et al. | 525/407 |
| 4,886,845 | 12/1989 | Becker et al. | 523/403 |
| 4,987,163 | 1/1991 | Becker et al. | 523/414 |
| 5,087,647 | 2/1992 | Flakus | 523/412 |
| 5,223,558 | 6/1993 | Ohba | 525/530 |
| 5,236,974 | 8/1993 | Dreischhoff et al. | 523/403 |
| 5,274,012 | 12/1993 | Neffgen et al. | 523/415 |

FOREIGN PATENT DOCUMENTS

| | | |
|---|---|---|
| 0109173 | 5/1984 | European Pat. Off. . |
| 0130686 | 1/1985 | European Pat. Off. . |
| 0144872 | 6/1985 | European Pat. Off. . |
| 0164589 | 12/1985 | European Pat. Off. . |
| 0176192 | 4/1986 | European Pat. Off. . |
| 0330155 | 8/1989 | European Pat. Off. . |
| 0497404 | 8/1992 | European Pat. Off. . |
| 0508120 | 10/1992 | European Pat. Off. . |
| 0577958 | 1/1994 | European Pat. Off. . |
| 899413 | 6/1962 | United Kingdom . |
| 89/01498 | 2/1989 | WIPO . |
| 91/10695 | 7/1991 | WIPO . |

OTHER PUBLICATIONS

Lee et al, "Handbook of Epoxy Resins", 1982 Reissue pp. 4–66.

J. Woo, et al., "Water Dispersible Epoxy–g–Acrylic Copolymer for Container Coating", Epoxy Resin Chemistry, ACS Symposium (1983), pp. 283–300.

Primary Examiner—John C. Bleutge
Assistant Examiner—Randy Gulakowski
Attorney, Agent, or Firm—Foley & Lardner

[57] ABSTRACT

Aqueous epoxy resin dispersion comprising (A) an epoxy resin which is a condensation product of (A-1) from 50 to 95% by weight, preferably from 55 to 85% by weight, of one or more epoxide compounds having at least two epoxide groups per molecule and an epoxide equivalent mass of from 100 to 2000 g/mol, (A-2) from 5 to 50% by weight, preferably from 15 to 45% by weight, of an aromatic polyol; and (A-3) from 0 to 25% by weight, preferably from 0 to 10% by weight, of modifying compounds containing at least two epoxide-reactive groups; (B) a dispersant comprising (B-1) a condensation product of a polyol having a weight-average molecular mass ($M_w$) of from 200 to 20,000 g/mol and an epoxide compound having on average at least two epoxide groups per molecule and an epoxide equivalent mass of from 100 to 10,000 g/mol, and (B-2) if desired other surfactants, preferably nonionic surfactants; (C) a polymer, prepared in this dispersion, of ethylenically unsaturated monomers which are capable of free-radical polymerization or copolymerization; (D) a curing agent for the epoxy resin (A); and (E) if desired, conventional additives and catalysts. These aqueous epoxy resin dispersions are suitable for the production of coatings, in particular for interior coatings of cans for beverages and preserves.

18 Claims, No Drawings

AQUEOUS, MODIFIED EPOXY RESIN DISPERSIONS

BACKGROUND OF THE INVENTION

Coating compositions for coating the interior of containers intended for the storage of foodstuffs and beverages have two principal tasks. On the one hand, they should protect the container material itself against aggressive components of the contents, such as acids of natural origin, in order to give the container a maximum lifetime. On the other hand, they should prevent contamination of the contents by the container material, for example, as a result of chemical reaction. Appropriate coatings thus ideally represent a chemically inert, impermeable barrier between contents and container.

To perform the stated tasks reliably the coatings must meet a series of requirements. They are required, for example, to have a good adhesion to steel, tinplate, aluminum and other conventional container materials, to be resistant to dilute acids (such as acetic acid, lactic acid, carbonic acid) and sulfur even at increased temperatures, to be resistant to pasteurization and sterilization and also to have a high degree of elasticity so as to withstand deformations of the container material, whether during production of the containers or, for example, by compression of the filled container, without suffering damage.

In addition, the coating compositions must not contain components which migrate into the contents and alter them in any way. To this end, appropriate coating compositions are subject to a restrictive, statutory regulatory framework; for example, in the Federal Republic of Germany by regulations of the Federal Health Board (BGA), or in the U.S.A. by 21 C.F.R. § 175.300.

In order to obtain a coating film which is ideally inert, the coating compositions generally used are one-component systems, the reactive groups of which react fully at elevated temperatures within a very short time, for example, at 200° C. in from eight to ten minutes, to form a high-grade crosslinked film.

Binders that have proven suitable in the past are relatively high molecular weight epoxy resins. In combination with appropriate curing agents, e.g., phenolic resins, amino resins, melamine and/or guanamine resins, dicyandiamide, polycarboxylic acids or their anhydrides, these epoxy resins cure fully under the stated conditions to give chemical-resistant, flexible films and are, in addition, permitted by the statutory regulations mentioned for use in the interior coatings of foodstuffs containers.

Coating combinations of this kind generally contain, however, a relatively large proportion of organic solvents. As part of the ever stricter statutory requirements with regard to the reduction or total avoidance of solvent emissions, one example of this being the VOC regulations in the U.S.A., the demand for low-solvent or solvent-free aqueous coating compositions for the interior coating of cans is growing. In fact there has already been a series of proposals in this direction, for the formulation of aqueous binders based on epoxy resin for the interior coating of foodstuffs containers.

One of the many possibilities proposed for the preparation of aqueous binders for the interior coating of cans is the modification of epoxy resins with acrylates. This modification may either be carried out via the reaction of epoxide groups with (meth)acrylic acid or derivatives thereof, in other words terminally, or by lateral grafting onto the epoxy resin structure. In almost all cases the monomers used include unsaturated acids such as, for example, acrylic acid, which are subsequently neutralized in order to impart solubility or dispersibility in water. Such systems generally still contain up to 25% of organic solvents and volatile amines and are of poor water-resistance.

"Acrylic systems" refers here to the systems obtained by (co)polymerization of $\alpha\beta$-unsaturated monomers ("acrylic monomers"), such as acrylic, methacrylic and vinyl compounds but also maleic, itaconic and fumaric acid derivatives.

It has been shown that combinations of such acrylic systems with epoxy resins may have outstanding properties, which are determined by the advantageous properties of the individual systems. Thus the epoxy system contributes good adhesion, flexibility, chemical resistance and toughness, while the acrylic system, depending on the monomers chosen, provides the possibility of targeted adjustment of glass transition temperatures, hardness and mechanical resistance.

Numerous heat-curing epoxy-acrylic systems for the can interior coating sector have already been described, principally systems in which the epoxy resin has been induced to undergo specific grafting or esterification with the acrylic resin, and dispersion is carried out by neutralizing the carboxyl groups with volatile bases.

U.S. Pat. No. 4,302,373 describes a binder which is obtained from modified epoxy resins, acidic acrylic systems and tertiary amines, which has a low solids content and contains a lot of organic solvent. This composition is not sterilization-resistant and is therefore suitable only for beverage cans.

U.S. Pat. No. 4,285,847 describes a system obtained by bulk grafting of an epoxy resin with a monomer mixture, the acrylic system containing carboxyl groups. The product mixture, comprising ungrafted epoxy resin, epoxy-acrylic system and acrylic polymer is dispersed in a water/solvent mixture by neutralization with volatile bases and is then subjected to emulsion polymerization with further acrylic monomers. The resulting ionic dispersion has a solids content of about 20%, of which about 45 parts comprise epoxy resin and 55 parts acrylate (of which 40 parts are styrene). The solvent content, at from 10 to 20%, is decidedly high; the binder is likewise suitable only for the interior coating of beverage cans.

The company Glidden (J. T. K. Woo et al., ACS Symp. Ser. No. 221, 283 (1983)) has a system on the market which likewise represents an amine-neutralized epoxy-acrylic graft copolymer with a high epoxy resin content, a low solids content (20%) and a high level of solvent (20%). It is employed in the beverage can sector as a pasteurization-resistant clearcoat.

Likewise, the system described in EP-A-0 144 872, which is based on amine-neutralized epoxy-acrylic esters in combination with epoxide phosphate esters, brings no significant improvement and, in particular, no sterilization resistance.

As a further development of the Glidden system, EP-A-0 164 589 relates to an amine-neutralized dispersion based on epoxy-maleate-phosphate esters, in which the acrylic monomers are copolymerized at the double bond of the maleate radical and consequently no grafting occurs at aliphatic carbon atoms. The films obtained with this system are not pasteurization-resistant.

A dispersion of three-layer particles is described in EP-A-0 508 120. The particles are composed of a core of acrylates with a low glass transition temperature, a middle shell comprising epoxy resin, and an outer shell of acrylates of high glass transition temperature that have a high acid number. Copolymerization is carried out in bulk and the product is likewise dispersed using volatile amines, to give a solids content of 40% and a solvents content of 20%. This system too is suitable only for beverage cans.

A sterilization-resistant system is described in EP-A-0 130 686. An autocrosslinking, sterically stabilized acrylate dispersion is obtained by emulsion polymerization in water/alcohol mixtures, and a liquid epoxy resin is dispersed in this dispersion. No volatile amines are used in this case. The result is a dispersion for sterilization-resistant binders which, however, are used principally as a wash-coat for the exterior coating of cans rather than for interior coatings.

Other systems are known in which grafting between the epoxy resin and the acrylic system is induced non-specifically by bulk polymerization. EP-A-0 176 192 describes aqueous two-component epoxide systems for cold curing. Either the epoxy resin and acrylic monomers are mixed and dispersed and the acrylic monomers are then emulsion-polymerized, or the epoxy resin is dispersed alone and is blended with a ready-made acrylate dispersion. It is mainly liquid epoxy resins which are used; cold curing is carried out using the conventional amine systems. No mention is made of an application for heat-curing systems or for the can coating sector at all.

Finally, WO 89/01498 specifies a system in which the epoxy resin is partially esterified with methacrylic acid, dispersion is carried out by amine neutralization after blending with an acidic, acrylic prepolymer, and typically styrene is incorporated in the dispersion by emulsion polymerization. This ionic dispersion has a high polystyrene content (30–40% epoxy resin, 22–26% acidic acrylic prepolymer and 35–50% polystyrene) and is suitable for pasteurization-resistant coatings.

Generally, the systems described above, which represent the state of the art, are used only rarely for the interior coating of cans, since the use of volatile amines is a problem in terms of both toxicology and odor; ionically-stabilized binders generally have an insufficient storage stability which is further restricted by a rise in viscosity as a result of slow reaction of the coreactants (phenolic resins, melamine resins).

Previous attempts have failed to produce an autocrosslinking, nonionically-stabilized epoxy-acrylic dispersion which, with a high solids content and little or no solvent, leads to sterilization-resistant films and which meets the requirements of an interior can coating as mentioned at the outset.

One route to aqueous coating compositions is the use of nonionic emulsifiers or the introduction of hydrophilic, nonionic groups into the epoxy resin. In this way (see e.g., EP-A-0 272 595) aqueous dispersions can be prepared which are storage stable, free of amine and low in solvent. Using these dispersions and appropriate coreactants, such as phenolic resins and/or melamine resins, however, it has likewise not previously been possible to produce any can coating compositions the properties of which come close to the quality standard achieved by conventional, solvent-containing systems; for example, it was not possible to formulate white coatings free from yellowing.

SUMMARY OF THE INVENTION

Accordingly, it is an object of the present invention to provide a coating composition which meets the above requirements.

It is also an object of the present invention to provide a method of making such a coating composition and methods of using such compositions, in particular as an interior coating for a can.

Surprisingly it now has been found that aqueous, low-solvent, nonionically-stabilized epoxy resin dispersions based on dispersions as described in EP-A-0 272 595, equivalent to U.S. Pat. No. 4,886,845, and DE-A-43 09 639 (these documents being hereby incorporated by reference in their entirety) give, after modification with "acrylates" in combination with specific polyfunctional carboxylic acids and/or their derivatives, coating combinations which cure under heat to give high-quality coatings which meet all of the above-mentioned criteria and are thus outstandingly suitable for the interior coating of foodstuffs containers such as, for example, cans for preserves and beverages.

In accordance with one aspect of the present invention, there is provided a heat-curable, aqueous, solvent-free epoxy resin dispersion comprising:

(A) an epoxy resin which is a condensation product of
  (A-1) from 50 to 95% by weight, preferably from 55 to 85% by weight, of one or more epoxide compounds having at least two epoxide groups per molecule and an epoxide equivalent mass of from 100 to 2000 g/mol,
  (A-2) from 5 to 50% by weight, preferably from 15 to 45% by weight, of an aromatic polyol, and
  (A-3) from 0 to 25% by weight, preferably from 0 to 10% by weight, of modifying compounds containing at least two epoxide-reactive groups, (B) a dispersant comprising
  (B-1) a condensation product of
    (B-1-$a$) a polyol having a weight-average molecular mass ($M_w$) of from 200 to 20,000 g/mol, and
    (B-1-$b$) an epoxide compound having on average at least two epoxide groups per molecule and an epoxide equivalent mass of from 100 to 10,000 g/mol, and
  (B-2) if desired other components, such as nonionic surfactants, (C) a polymer, prepared in the dispersion of (A) in (B), of ethylenically unsaturated monomers which are capable of free-radical polymerization or copolymerization, (D) a curing agent for the epoxy resin (A), and (E) if desired, other curing agents and conventional additives and catalysts, and ionic surfactants if desired. The dispersion can be a one- or two-component system.

The invention also relates to a process for the preparation of this heat-curing binder in which the epoxy resin (A) is first prepared by condensation of components (A-1), (A-2) and, if desired, (A-3), at elevated temperatures in the presence of a condensation catalyst, and then the monomers which will form polymer (C), or at least a portion thereof, are added. The dispersant (B) is then homogeneously incorporated, and an aqueous dispersion is produced by the portion-wise addition of water after which the monomers are polymerized at suitable temperatures using an appropriate initiator system and, if appropriate, with the addition of the remaining monomers.

Finally, the curing agent (D) and, if desired, the conventional additives (E) are carefully and homogeneously incorporated into the dispersion obtained, it being possible if desired to add organic solvents at each stage of the process. In the embodiment of the invention as a two-component system, the addition of the curing agent (D) is omitted in this process.

The invention also relates to the use of the binders according to the invention for the production of coatings, especially corrosion-resistant baking primers, fillers and topcoats on, preferably, metallic substrates, and also for the preparation of interior and exterior coatings for crown caps and screw closures and for coil-coating materials which still undergo severe deformation after crosslinking, and relates in particular to their use for the interior coating of cans for beverages and preserves.

Further objects, features and advantages of the present invention will become apparent from the detailed description of preferred embodiments which follows.

DETAILED DESCRIPTION OF THE PREFERRED EMBODIMENTS

The epoxy resin (A) of the dispersions according to the invention preferably has a molar mass per epoxide group (epoxide equivalent mass) of from 350 to 4000 g/mol, in particular from 400 to 2000 g/mol. The average particle size of the dispersed resin (A) is generally no greater than 1.0 μm and is preferably from 0.2 to 0.8 μm.

The epoxide compounds (A-1) and (B-1) may be any type of polyepoxides having on average at least two epoxide groups per molecule. They are generally 1,2-epoxides. These epoxide compounds may be either saturated or unsaturated and may be aliphatic, cycloaliphatic, aromatic and/or heterocyclic, and also may contain hydroxyl groups. In addition, they may contain those substituents and/or functional groups which, under the conditions of mixing or reaction, do not cause any interfering secondary reactions, examples being alkyl or aryl substituents, ether groups and the like.

The epoxide compounds are preferably polyglycidyl ethers based on polyhydric, preferably dihydric, alcohols, phenols, hydrogenation products of these phenols, and/or novolaks (reaction products of mono- or polyhydric phenols with aldehyde, especially formaldehyde, in the presence of acid catalysts). The epoxide equivalent mass of these epoxide compounds is preferably between 100 and 2000 g/mol, in particular between 100 and 350 g/mol.

Examples of polyhydric phenols which may be mentioned are resorcinol, hydroquinone, 2,2-bis(4-hydroxyphenyl)propane (bisphenol A), isomer mixtures of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, 1,1-bis(4-hydroxyphenyl)ethane, 2,2-bis [4-(2-hydroxypropoxy)phenyl]propane, 1,1-bis(4-hydroxyphenyl)isobutane, 2,2-bis(4-hydroxy-tert-butylphenol)propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulfone, etc., and the halogenation and hydrogenation products of the above-mentioned compounds. Bisphenol A is particularly preferred in this respect.

Examples of polyhydric alcohols are ethylene glycol, diethylene glycol, triethylene glycol, polyethylene glycols, 1,2-propylene glycol, polypropylene glycols, 1,3-propylene glycol, 1,4-butanediol, 1,5-pentanediol, 1,6-hexanediol, 1,2,6-hexanetriol, glycerol, neopentylglycol, 1,4-dimethylolcyclohexane, trimethylolethane, trimethylolpropane, and ethoxylated and propoxylated bisphenols such as, for example, propoxylated bisphenol A. Polypropylene glycols (n=8–10) are particularly preferred in this respect.

Polyglycidyl esters of polycarboxylic acids can also be used, which are obtained by reacting epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, hexahydrophthalic acid, 2,6-naphthalenedicarboxylic acid and dimerized linolenic acid. Examples are diglycidyl adipate, diglycidyl phthalate and diglycidyl hexahydrophthalate.

A detailed list of suitable epoxy compounds useful in the present invention can be found in the handbook *Epoxidverbindungen und Epoxidharze* [*Epoxide Compounds and Epoxy Resins*] by A. M. Paquin, Springer Verlag, Berlin 1958, chapter IV and in Lee, Neville, *Handbook of Epoxy Resins*, Mc Graw-Hill Book Co., 1967, chapter 2. The epoxide compounds mentioned can be employed individually or in a mixture.

Suitable aromatic polyols (A-2) include any known in the art and include preferably the aromatic compounds that contain OH groups which were described above for components (A-1), i.e., polyhydric, preferably dihydric phenols, their halogenation products and/or novolaks. In this case too, bisphenol A is particularly preferred.

The modifying compounds (A-3) are compounds having at least two functional groups which are able to react with the epoxide groups of component (A-1), and which compounds cannot be classified under the aromatic polyols (A-2). They can be used to bring about targeted modification of desirable properties in the base resin (A). The compounds used in this context may be polyamines (e.g., ethylenediamine, diethylenetriamine, triethylenetetramine, tetraethylenepentamine, and the like), polyoxyalkylene oxides having terminal amino groups (e.g., Jeffamine® and Novamine®), polycarboxylic acids (e.g., maleic acid, fumaric acid, phthalic acid, succinic acid, dimeric and trimeric fatty acids, and the like, and their anhydrides, the acids as described for the carboxyl group-containing curing agents (D)), as well as aliphatic polyols (e.g., ethylene glycol, propylene glycol, butylene glycol, polyethylene glycol, polypropylene glycol, trimethylolpropane and trimethylolethane, neopentylglycol, glycerol, and the like). Particular preference is given to dimeric fatty acids preferably containing from 20 to 50 carbon atoms.

The dispersant (B) is a condensation product (B-1) of a polyol (B-1-a) and an epoxide compound (B-1-b) that has at least two epoxide groups, which is optionally blended with other, preferably nonionic surfactants (B-2).

The polyols (B-1-a) are preferably polyether-polyols (polyalkylene glycols) that have average molecular masses ($M_w$; gel permeation chromatography; polystyrene standard) of from 200 to 20,000 g/mol, preferably between 600 and 12,000 g/mol, in particular from 2000 to 8000 g/mol, and OH numbers which are advantageously from 10 to 600 mg of KOH/g, preferably from 15 to 120 mg of KOH/g. These polyether-polyols preferably possess only terminal, primary OH groups. Examples of these are block copolymers of ethylene oxide and propylene oxide and also polyethylene glycols, polypropylene glycols and polybutylene glycols, with the use of mixtures of the respective polyalkylene glycols also being possible. Polyethylene glycols preferably are used.

The dispersant (B-1) preferably is prepared by condensation of the stated polyether-polyols with the polyglycidyl ethers described above in the presence of any suitable catalysts at from 50° to 200° C., preferably at from 90° to 170° C., the ratio of equivalents of the OH groups to the epoxide groups generally being from 1:0.5 to 1:1.5, preferably from 1:0.95 to 1:1.25, and the epoxide equivalent mass of the condensation product being at least 5000 g/mol, preferably from 100,000 g/mol to 400,000 g/mol.

Suitable catalysts for the preparation of the dispersant (B-1) are strong inorganic and organic bases such as, for example, sodium hydroxide, potassium hydroxide, lithium hydroxide, barium hydroxide, strontium hydroxide, alkali metal alkoxides such as sodium methoxide, lithium methoxide, sodium ethoxide and potassium dodecoxide and the alkali metal salts of carboxylic acids, for example, sodium and lithium stearate or lactate. Also suitable are strong inorganic and organic protic acids, for example, phosphoric acid, sulfuric acid, tetrafluoroboric acid and benzenesulfonic acid. Other catalysts which can be used are Lewis acids. Examples are tin(IV) chloride, titanium(IV) chloride, titanium(IV) isopropoxide, triethyloxonium tetrafluoroborate, and boron trifluoride and its complexes with, for example, phosphoric acid, acetic acid (1:1 and 1:2), methanol, diethyl ether, tetrahydrofuran, phenol, ethylene glycol monoethyl ether, polyethylene glycol (MW 200), dimethyl sulfoxide, di-n-butyl ether, di-n-hexyl ether, succinic acid and aliphatic, cycloaliphatic and araliphatic amines, and also nitrogen heterocycles.

The catalysts preferably employed are $BF_3$-diethyl ether, BF3-acetic acid and aqueous tetrafluoroboric acid. The quantity of catalyst is in general from 0.1 to 5%, preferably from 0.1 to 1%, based on the mass of the reaction mixture. For easier metered addition, the catalyst may be diluted in a solvent such as diethyl ether, a glycol ether or cyclic ether, ketones and the like.

The dispersant (B-1) is prepared by heating the mixtures to be reacted, comprising compounds containing hydroxyl groups and epoxide groups, up to the temperature at which condensation takes place at a sufficient rate, i.e., within 30 minutes to 5 hours. The reaction is advantageously monitored by the increase in the epoxide equivalent, which indicates a decrease in the content of epoxide groups. The reaction can be terminated by cooling to below the reaction temperature.

The condensation product thus obtained can be used as it is (100%) as dispersant (B-1) or (B) for the preparation of the dispersions according to the invention. Preferably however, for reasons of easier handling, a mixture is prepared of from 20 to 99% by weight, preferably from 40 to 60% by weight, of the condensation product and an aqueous medium comprising (based on the total mixture) up to 50% by weight, preferably up to 30% by weight, of an organic solvent and up to 80% by weight, preferably from 15 to 60% by weight, of water, and this mixture is used as dispersant (B-1) or (B). Particularly suitable organic solvents are glycols, mono- and diethers and mono- and diesters of glycols with alcohols and acids, aliphatic alcohols with linear or branched alkyl radicals of from 1 to 12 carbon atoms, cycloaliphatic and araliphatic alcohols, and esters and ketones, in which case these solvents can be employed individually or as a mixture. Examples are ethylene glycol, ethylene glycol monomethyl ether, ethylene glycol dimethyl ether, butylglycol, methoxypropanol, ethoxypropanol, ethanol, 1- and 2-propanol, butanol, cyclohexanol, benzyl alcohol, ethyl acetate, acetone and methyl isobutyl ketone. It is preferred to employ butylglycol, methoxypropanol, ethoxypropanol, 2-propanol, hydroxyethyl or hydroxypropyl methacrylate and/or benzyl alcohol. Particularly preferred, however, is the use of pure water as solvent for the dispersant (B-1) or (B).

In addition to the dispersant (B-1) it is also possible to use other dispersants (B-2) of anionic, cationic and preferably nonionic type. Suitable anionic surfactants include alkylbenzenesulfonates, primary and secondary alkanesulfonates, α-olefinsulfonates, alkyl sulfates and alkyl ether-sulfates and suitable cationic surfactants include quaternary ammonium compounds, it being ensured that the ionic groups do not interact with the epoxide groups. It is preferable, however, to use nonionic surfactants such as ethoxylated or ethoxylated/propoxylated alcohols, oxo alcohols, alkylphenols (e.g., Arcopal® grades from Hoechst), castor oils, esters, glycerol stearates, fatty acids, fatty amines, fatty alcohols, and also, for example, ethylene oxide/propylene oxide block copolymers (e.g., Pluronic® from BASF). Other products which can be used are the emulsifiers described specifically for the dispersion of epoxy resins, for example, those known from U.S. Pat. No. 4,423,201 and U.S. Pat. No. 4,446,256 (products of polyalkylene glycols, diisocyanates and bisphenols), EP-A-0 497 404 (products of alkoxypolyalkylene glycols, anhydrides and alkylene oxides, epoxy alcohols or diglycidyl ethers), WO 91/10695 (products of polyglycidyl ethers, bifunctional compounds and alkoxypolyalkylene glycols), EP-A-0 109 173 (products of polyoxyalkylenepolyamines and epoxy resins) and DE-A-41 36 943 (products of polyalkylene glycols with diisocyanates and polyepoxides).

Suitable monomers used to prepare polymer (C) are all ethylenically unsaturated compounds which are capable of free-radical emulsion polymerization and which do not react at room temperature with the epoxy resin dispersion which is present. These include acrylic, methacrylic and higher alkacrylic acids and their alkyl esters ($C_1$- to $C_{18}$-alkyl (meth)acrylates, e.g., methyl acrylate and methyl methacrylate, ethyl acrylate and ethyl methacrylate, n- and iso-propyl acrylate and methacrylate, n-, iso- and tert-butyl acrylate, n- and tert-butyl methacrylate, 2-ethylhexyl acrylate and methacrylate, 4-tert-butylcyclohexyl acrylate, isobornyl acrylate and methacrylate, etc.) and derivatives (e.g., acrylonitrile), and also vinyl derivatives (e.g., styrene, α-methylstyrene, vinyltoluenes, vinyl acetate, vinyl chloride, vinylidene chloride, N-vinylpyrrolidone, etc.) and α,β-unsaturated carboxylic acids such as maleic acid, fumaric acid, itaconic acid, and the like and derivatives thereof, and also alkenes such as isoprene and butadiene.

There is no need to neutralize the polymers (C) if acid monomers such as (meth)acrylic acid, maleic acid or itaconic acid are used. As volatile amines are generally used for such purpose, this leads to an excessive content of these compounds in the coating. The products of this invention, therefore, have a residual amine content of less than 0.5% by weight of the coating.

The monomers may also contain functional groups which participate in the curing reaction which is desired at a later time. Specific examples of compounds which are suitable in this context are glycidyl- and hydroxy-functional monomers (e.g., glycidyl methacrylate, 2-hydroxybutyl acrylate, 4-hydroxybutyl acrylate, 2-hydroxyethyl acrylate, 2-hydroxyethyl methacrylate, 2-hydroxypropyl acrylate, hydroxypropyl methacrylate, etc.), and also amido-functional compounds (e.g., acrylamide) or N-methylol monomers (e.g., N-methylolacrylamide). Finally, it is also possible for polyfunctional monomers to be present, either in relation to the polymerization or to the curing, examples being 1,6-hexanediol diacrylate, and divinylbenzene. The monomer mixtures preferably employed are those which give carboxy-functional and/or glycidyl-functional polymers, i.e., monomers such as (meth)acrylic acid, fumaric acid, itaconic acid, maleic acid, glycidyl (meth)acrylate and the like, which are used in combination with other monomers, the quantity of the functional monomers being up to 70% by weight of the mixture and preferably from 10 to 40% by weight.

The monomers listed can be added all at once prior to the dispersion, in which case they serve to reduce the viscosity and facilitate dispersion, or in the case of a relatively high polymer content some of them may be present during the dispersion operation while the remainder are metered in continuously during the emulsion polymerization. This enables the specific production of core-shell particles. The presence of the monomers during the dispersion has the advantage that it is not necessary to reduce the viscosity maximum during the phase inversion from water-in-oil to oil-in-water because of inert solvents which remain in the finished dispersion, as has been described in EP 272 595. It thus is possible to successfully formulate completely solvent-free dispersions, another considerable improvement over the prior art. An excessive monomer content during the dispersion operation, however, would reduce the viscosity to a value so low that it would no longer be possible to build up the shear force necessary for the dispersion processes. For this reason it may be necessary to divide the monomers into appropriate portions.

It is, however, also possible if desired to add solvents to the dispersion comprising epoxy-acrylic resin and dispersant. Suitable organic solvents in this case are likewise those mentioned for the dispersant (B), and aromatics such as toluene or xylene can also be used. The solvents can be employed individually or as a mixture. Preferred solvents are again butylglycol, methoxypropanol, methoxybutanol, isopropoxypropanol, ethoxypropanol, 2-propanol and/or benzyl alcohol.

After the operation of dispersion has been completed the emulsion polymerization to form polymer (C) is initiated in the epoxy resin dispersion at a temperature which ensures a rapid and complete reaction and simultaneously does not pose a threat to the dispersion. Suitable initiators for this purpose are those of the thermal type, or redox systems, all of which are well known to those skilled in the art.

Examples of thermal initiators are dibenzoyl peroxide, acetyl peroxide, benzoyl hydroperoxide, tert-butyl hydroperoxide, di-tert-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl tert-butyl peroxide, butyl tert-butyl peroxide, dilauroyl peroxide, difuryl peroxide, ditriphenylmethyl peroxide, bis(p-methoxybenzoyl) peroxide, p-monomethoxybenzoyl peroxide, rubrene peroxide, ascaridole peroxide, tert-butyl peroxybenzoate, diethyl peroxyterephthalate, propyl hydroperoxide, isopropyl hydroperoxide, n-butyl hydroperoxide, cyclohexyl hydroperoxide, trans-decalin hydroperoxide, α-methylbenzyl hydroperoxide, α-methyl-α-ethylbenzyl hydroperoxide, tetralin hydroperoxide, triphenylmethyl hydroperoxide, diphenylmethyl hydroperoxide, 2,5-dimethyl-2,5-bis(2-ethylhexanoylperoxy)hexane, 1,1-bis(tert-butylperoxy)cyclohexane and tert-butyl perbenzoate.

Redox systems can be selected from at least partially water-soluble oxidants such as, for example, hydrogen peroxide, tert-butyl hydroperoxide and persulfates in combination with reducing agents such as alpha-hydroxy ketones, ascorbic acid, hydrazine and sulfites, bisulfites, metasulfites or hydrosulfites. The initiators employed should preferably generate few or no ionic compounds, so as not to increase unnecessarily the water-sensitivity of the films which are baked subsequently. A particularly preferred system is tert-butyl hydroperoxide/ascorbic acid.

The curing agents (D) are either added directly to the dispersion (one-component system) or, as a suitable formulation, are not admixed until directly prior to use (two-component system).

Suitable curing agents (D) for the dispersions according to the invention are all of the known chemical curing compounds, for example, amines, amides, Lewis acids, phenols, phenolic resins, amino resins, carboxylic acids and their anhydrides. Particularly suitable are curing agents which contain carboxyl groups, such as water-soluble or water-miscible polycarboxylic acids. Examples of such polycarboxylic acids are cyclopentanetetracarboxylic acid, cyclobutanetetracarboxylic acid, 1,2,3,4-butanetetracarboxylic acid, tartaric acid, malonic acid, malic acid, citric acid, aconitic acid, and the like. The quantity of this curing agent (D) is selected such that the ratio of epoxide equivalents to carboxyl equivalents is generally at least 1:0.5. The terms "carboxyl equivalent" and "epoxide equivalent" in this context include, where present, those monomers of (C) which contain carboxyl groups and/or glycidyl groups.

Also suitable curing agents are anhydrides or acid esters of these acids with polyhydric alcohols of from 2 to 12 carbon atoms, preferably from 2 to 6 carbon atoms, for example, neopentylglycol, glycerol, trimethylolethane or trimethylolpropane, the alkanediols and their oligomers, which may contain one or more ether bridges, such as ethylene glycol, propanediol and butanediol, the esters always containing at least two free carboxyl groups. It is also possible to use acid esters, containing two or more carboxyl groups, of carboxylic acids such as, for example, pyromellitic acid, trimellitic acid, phthalic acid, endomethylenetetra- or -hexahydrophthalic acid, maleic acid, fumaric acid and/or their anhydrides where these exist, with polyhydric alcohols, for example, those mentioned above, as polycarboxylic acid curing agents, insofar as these acid esters possess an adequate solubility or dilutability in water. It is also possible to employ suitable acidic hydrophilic polyesters of, for example, the polyhydric acids with the polyhydric alcohols mentioned.

Other compounds which can be employed as curing agents are reaction products of these acid anhydrides or acids with polyamino-functional compounds, for example, polyamines such as diethylenediamine, diethylenetriamine, triethylenetetramine and higher homologs, or with a wide variety of polyoxyalkylenediamines (Jeffamine® from Texaco), and also hydroxycarboxylic acids, or hydroxycarboxylic acids which are modified on the hydroxyl groups, for example, alkoxylated citric acid or tartaric acid etc., and also all acids which are able to undergo transesterification under curing conditions, for example, the methyl esters of trimellitic acid or malic acid. Likewise suitable are acid salts of the above-mentioned acids, preferably those with volatile bases, and other derivatives which liberate reactive carboxyl groups under curing conditions. The acidic curing agents preferably employed are polycarboxylic acids.

The epoxy resin dispersions are cured with the acidic curing agents advantageously at elevated temperatures, for example, at from 60° to 300° C. and preferably at from 80° to 250° C., generally in from one to 150 minutes. In order to achieve complete curing, or to reduce the temperatures necessary for sufficiently complete curing, the acidic curing agents mentioned also may have added to them small quantities of compounds which catalyze the curing reaction. Examples of suitable compounds are strong protic acids such as phosphoric acid or para-toluenesulfonic acid and salts thereof, tertiary amines such as triethylamine and N,N-dimethylbenzylamine, nitrogen heterocycles such as imidazole, pyridine and their derivatives, trialkyl- and triarylphosphines and also corresponding phosphonium compounds and metal salts or metal chelates, for example, tin(II) octanoate or aluminum acetylacetonate.

In addition to the curing agents described above, it is also possible to cure using amino and/or phenolic resins which are employed in quantities of from 5 to 50% by weight, preferably from 10 to 35% by weight, based on the overall solids content of the finished dispersion. If desired, the dispersion is in this case adjusted further, using additional water, to an overall solids content of from 10 to 80% by weight. Examples of such amino resins are amine/aldehyde resins, i.e., condensation products of aldehydes with melamine (melamine resins), urea (urea resins), acetoguanamine (acetoguanamine resins) or similar compounds and/or corresponding precondensates. Preferred aldehyde condensation products of melamine are in particular the melamine methoxyalkyl ethers, in which the alkyl radicals are methyl, n-butyl or isobutyl groups, preferably methyl groups, such as hexamethoxymethylmelamine, ethoxymethoxymethylmelamine, monomethylolpentamethoxymethylmelamine, dimethyloltetramethoxymethylenemelamine, trimethyloltrimethoxymethylenemelamine and the like with a substantially monomeric structure, and also corresponding oligomeric or polymeric products.

Phenolic resin curing agents which can be mentioned are resols, formaldehyde phenolcarboxylic acid resins and phenolic resin precursors, in which context the commercially available, etherified, water-dilutable phenolic resin resols are preferred.

It is also possible if desired to add acidic catalysts such as para-toluenesulfonic acid, cyclohexanesulfamic acid, acidic butyl phosphate and phosphoric acid, as (amine) salts if desired, to the dispersions containing phenolic and/or amino resin, in order to accelerate the curing reaction and thus to give films or coatings which cure fully at a low temperature or in a shorter time. The quantity of these acidic catalysts is, for example, 2% by weight based on the overall solids content.

The ratio of epoxy resin (A) to addition polymer (C) is generally from 99.5:0.5 to 20:80, preferably between 5:95 and 50:50, % by weight. This polymer (C) may if desired be composed of monomers which contain carboxyl groups and/or glycidyl groups, preferably to the extent of from 2.5 to 25% by weight. The amount of curing agent (D) is generally chosen such that, taking into account the reactive groups which may be present in (C), a ratio of equivalents of COOH to epoxide groups of from 0.5:1 to 5:1, preferably 0.6:1 to 1.5:1, is reached. The content of dispersant (B) is related to all the water-insoluble components of the dispersion, i.e., to the epoxy resin (A), the polymer (C) and, if appropriate, to the curing agent (D) if the latter is not soluble in water, and is generally between 2.5 and 25% by weight, preferably between 5 and 15% by weight. The composition of the dispersant in terms of (B-1):(B-2) is between 0:100 and 100:0, preferably greater than 75:25. The solids content of the dispersion according to the invention is between 20 and 80% by weight, but preferably from 45 to 65% by weight, the dispersion possibly containing up to 10% by weight of solvent but preferably being free from solvent.

Additives (E) which may be required and, if desired for the intended use, further curing agents are added in amounts such as are required for the corresponding purpose and are known to those skilled in the art. In this case it is up to the user to choose the solids content and solvent content.

In addition to the binder (A)+(B)+(C)+(D) the dispersions according to the invention may also contain other curable binders. Such additional binders are, for example, resins which are dispersible in aqueous media and are based on hydroxyalkyl acrylates, hydroxy alkyds, polyesters, epoxy resins and the like. The proportion of these additives may be from approximately 0 to 80% by weight, preferably from 20 to 40% by weight, based on the overall solids content. The addition of such resins may be used to exert diverse influences on the properties of the products prepared from the dispersions. For example, it is possible to increase the resistance to yellowing by the addition of acrylate resins, whereas the presence of alkyd resins markedly improves the elasticity of the coatings prepared therefrom.

The viscosity of the dispersions of the present invention is in general between 200 and 30,000 mPa.s, preferably between 750 and 7000 mPa.s.

Examples of conventional additives in the context of (E), which may possibly be present in the dispersions according to the invention, are the conventional paint additives such as pigments, pigment pastes, antioxidants, leveling agents and thickeners, antifoams/deaerating agents and/or wetting agents, reactive diluents, fillers, catalysts, preservatives, protective colloids and the like. These additives, like the curing agents, if desired may be added to the dispersion immediately prior to processing.

The dispersions thus obtained generally contain less than 10% bei weight of organic solvents which may be introduced together with the dispersant (B) or two monomers that subsequently are polymerised to form the polymer (C). However, it is preferred that there is less than 5% by weight of organic solvents in the final dispersion, and most preferably no solvent is used at all to yield a solvent-free dispersion.

For the preparation of the epoxy resin dispersions according to the invention any desired process can be used. Preferably, the epoxy resin (A) is first prepared by condensation of components (A-1) and (A-2) and, if desired, (A-3), at elevated temperatures, in general at from 100° to 220° C. and preferably at 150° to 180° C., in the presence of a catalyst which accelerates the condensation.

Where two or more epoxide compounds (A-1) are employed, the condensation reaction is preferably carried out in two stages, in which case in a first reaction one or more components (A-1) are reacted with components (A-2) and if desired (A-3) in a quantitative ratio such that this first condensation product has an epoxide equivalent mass of more than 5000 g/mol, preferably more than 20,000 g/mol, and contains phenolic groups which are still free, and in a further condensation reaction this first condensation product is reacted with further epoxide compounds (A-1), so that finally the desired epoxy resin (A) is obtained.

Any desired condensation catalyst can be used. Examples of suitable condensation catalysts are phosphines such as triphenylphosphine, phosphonium salts such as benzyltrimethylphosphonium chloride, tertiary amines such as N,N-dimethylbenzylamine, quaternary ammonium salts such as tetramethylammonium chloride, alkali metal hydroxides such as sodium hydroxide and lithium hydroxide, alkali metal carbonates such as sodium carbonate and lithium carbonate, alkali metal salts of organic acids, such as sodium formate, lithium benzoate and lithium stearate, and Lewis acids such as boron trifluoride and its complexes, titanium tetrachloride, tin chloride and triethyloxonium tetrafluoroborate.

The epoxy resin (A) is subsequently admixed, generally at temperatures of from 60° to 200° C., preferably from 70° to 120° C., with the monomers (C) or an appropriate portion thereof, then the dispersant (B) and, if desired, organic solvents and is stirred for from 15 to 180 and preferably from 30 to 90 minutes. As an alternative it is possible, after adding the monomers, to carry out (at least partial) reaction between epoxy resin and monomers, for example, addition of carboxyl or amine monomers to the epoxide groups or grafting onto aliphatic carbon atoms of the epoxy resin, before adding the dispersant.

Subsequently the appropriate quantity of water, preferably in two or more portions, is metered in with vigorous stirring at temperatures of generally from 30 to 100° C., preferably from 50° to 90° C., to produce the aqueous dispersion. At this stage it is possible, if desired, to add suitable antifoam/deaeration additives.

The epoxy resin (A) is advantageously dispersed in water using appropriate dispersion apparatus, for example, a high-speed paddle stirrer, a pulsation-type spiral mixer, a colloid mill, a homogenizer, a dissolver or another rapid mixer with high shear force.

In the resulting, monomer-containing, epoxy resin dispersion, the emulsion polymerization is initiated at an appropriate temperature. The temperature must be sufficiently high for a rapid polymerization rate to be achieved; on the other hand, an excessive temperature must not be allowed to pose a threat to the stability of the dispersion. In the case of redox initiators, the oxidizing agent preferably is incorporated homogeneously together with the dilution water, and the reducing agent is metered in continuously. If the quantity of monomer is greater than that required for the dispersion, then the remaining quantity of monomers and, if appropriate, the remaining quantity of the dispersant also are metered in, enabling the specific preparation of core-shell acrylate particles, in order to exert the desired control over the properties of the dispersion. The preferred temperature range for the emulsion polymerization is from 20° to 90° C., with the reaction being monitored by determining the solids content or by gas chromatography. Any unwanted increase in viscosity can be compensated by metering in additional water.

Then, in the embodiment of the invention as a one-component system, the curing agent (D) is added with vigorous stirring, with thorough homogenization likewise being achieved by prolonged stirring for generally from 15 to 180 and preferably from 30 to 90 minutes. It is possible, if desired, to add to the resulting heat-curing 1-component binder, with good homogenization, the conventional additives, pigments, fillers and/or other curing resins.

The curing agents can be added in toto or in portions to the epoxy resin dispersions, directly after their preparation or alternatively shortly before application. The substances (D) are preferably added directly after the preparation of the epoxy resin dispersion, with thorough homogenization.

In comparison with the known aqueous coating compositions for the interior coating of foodstuffs containers of all kinds, those according to the invention are distinguished by outstanding storage stability, freedom from amine and paucity in or freedom from solvent. In addition, as nonionically stabilized systems, they are extremely insensitive to fluctuations in pH and to the effects of water hardness, they have a high solids content compared with ionically-stabilized binders, despite their low viscosity, and they exhibit good pigmentability.

The binders or aqueous coatings obtained in accordance with the invention can be applied by conventional methods such as dipping, roller coating, spraying, brushing, and the like, in a thin layer to a wide variety of preferably metallic substrates and can be baked advantageously at temperatures of from 60° to 300° C., preferably from 80° to 250° C., within from 1 to 150 minutes.

The coatings obtained using the coating compositions according to the invention have a high degree of crosslinking, and are resistant to chemicals, sterilization, pasteurization and water. On baking they show little or no yellowing, good evenness and gloss, and outstanding adhesion to a wide variety of substrates, even when subjected to mechanical stress such as, for example, that during thermoforming.

The examples which follow describe the preparation of the epoxy resin (A), of the dispersant (B), of the dispersion of (A)+(B)+(C) and of the heat-curing binder (A)+(B)+(C)+(D), and also its use, with the examples being of the absolutely solvent-free systems which are particularly preferred, but are not required.

EXAMPLES

I. Epoxy resins (A)

1) In a 1 l four-necked flask fitted with thermometer, paddle stirrer, reflux condenser and dropping funnel, 144 g of a polypropylene glycol diglycidyl ether having an epoxide equivalent mass of about 340 g/mol and 231 g of bisphenol A were heated at 130° C. with stirring under an inert gas atmosphere. After addition of 300 mg of catalyst 1201 from Shell Chemie (quaternary phosphonium iodide) heating was continued to 160° C. and the temperature was maintained at this level until the epoxide equivalent mass of the reaction product was more than 10,000 g/mol. The batch was then cooled to 120° C. and, at this temperature, 525 g of a diglycidyl ether of bisphenol A having an epoxide equivalent mass of 183 g/mol were added. After addition of a further 300 mg of the above-mentioned catalyst, the mixture was heated to 160° C. and this temperature was maintained until the product had an epoxide equivalent mass of 729 g/mol.

2) The procedure was exactly as in Example I.1) but the raw materials were introduced together and reacted in one stage using 600 mg of the catalyst.

3) As described in Example I.2), 26 g of a modified epoxy resin (diglycidyl ether of propoxylated bisphenol A, DOW experimental resin XU 7189100) having an epoxide equivalent mass of 345 g/mol were reacted with 73 g of a polypropylene glycol diglycidyl ether having an epoxide equivalent mass of about 340 g/mol and 239 g of bisphenol A to give a product having an epoxide equivalent mass of 725 g/mol.

4) As described in Example I.2), 26 g of the diglycidyl ether of cyclohexanedimethanol (Epodil 757 from Anchor) having an epoxide equivalent mass of 160 g/mol were reacted with 72 g of a polypropylene glycol diglycidyl ether having an epoxide equivalent mass of about 340 g/mol, 235 g of a diglycidyl ether of bisphenol A having an epoxide equivalent mass of 183 g/mol and 117 g of bisphenol A to give a product having an epoxide equivalent mass of 720 g/mol.

5) As described in Example I.2), 69.5 g of resorcinol were reacted with 72 g of a polypropylene glycol diglycidyl ether having an epoxide equivalent mass of about 340 g/mol and 308.5 g of a diglycidyl ether of bisphenol A having an epoxide equivalent mass of 183 g/mol to give a product having an epoxide equivalent mass of 703 g/mol.

6) As described in Example I.2), 27 g of resorcinol and 56 g of bisphenol A were reacted with 102 g of a polypropylene glycol diglycidyl ether having an epoxide equivalent mass of about 340 g/mol and 240 g of a diglycidyl ether of bisphenol A having an epoxide equivalent mass of 183 g/mol to give a product having an epoxide equivalent mass of 772 g/mol.

7) As described in Example I.2), 93.5 g of bisphenol A were reacted with 58 g of a polypropylene glycol diglycidyl ether having an epoxide equivalent mass of about 340 g/mol and 212 g of a diglycidyl ether of bisphenol A having an epoxide equivalent mass of 183 g/mol to give a product having an epoxide equivalent mass of 733 g/mol.

8) A mixture of 103.4 g of polypropylene glycol diglycidyl ether having an epoxide equivalent mass of about 340 g/mol, 223 g of a diglycidyl ether of bisphenol A having an epoxide equivalent mass of 183 g/mol, 93.5 g of bisphenol A and 30.2 g of a dimeric fatty acid of average molecular mass 567 g/mol (Pripol 1009 from UNICHEMA) are heated at 150° C. and, after addition of 0.7 g of Shell catalyst 1201, are maintained at 160° C. until a constant epoxide-equivalent mass of 745 g/mol is reached.

II. Dispersants (B)

1) 309 g of technical-grade polyethylene glycol having a weight-average molecular mass ($M_w$) of 4000 g/mol and 34.1 g of a polyglycidyl ether based on bisphenol A and having an epoxide equivalent mass of 183 g/mol were heated together to 100° C., and 0.35 ml of 50% strength aqueous tetrafluoroboric acid was added with stirring. The ratio of equivalents of OH groups to epoxide groups was 1:1.20. The mixture was heated further to 130° C. and maintained at this temperature until the epoxide equivalent mass of the condensation product was approximately 350,000 g/mol. After cooling, the emulsifier had a brittle, wax-like firm consistency.

2) 155 g of technical-grade polyethylene glycol having an average molecular mass ($M_w$) of 2000 g/mol and 34.1 g of a polyglycidyl ether based on bisphenol A and having an epoxide equivalent mass of 183 g/mol were heated together to 100° C., and 0.35 ml of 50% strength aqueous tetrafluoroboric acid was added with stirring. The ratio of equivalents of OH groups to epoxide groups was 1:1.20. The mixture was heated further to 130° C. and was maintained at this temperature until the epoxide equivalent mass of the condensation product was approximately 350,000 g/mol. After cooling, the emulsifier had a wax-like firm consistency.

3) 250 g of the condensation product prepared in accordance with Example II.1) were dissolved in 250 g of water with stirring and gentle heating to about 80° C. The clear, pale yellow emulsifier solution obtained had a viscosity (measured in accordance with Brookfield at 25° C.) of 3500 mPa.s and a solids content of 50%.

4) 150 g of the condensation product prepared in accordance with Example II.1) together with 100 g of the condensation product prepared in accordance with Example II.2) were dissolved in 250 g of water with stirring and gentle heating to about 70° C. The clear, pale yellowish emulsifier solution obtained had a viscosity (measured in accordance with Brookfield at 25° C.) of 1800 mPa.s and a solids content of 50%.

III. Epoxy-acrylate dispersions (A)+(B)+(C)

Abbreviations for the monomers:

| | |
|---|---|
| MMA | Methyl methacrylate |
| HEMA | 2-Hydroxyethyl methacrylate |
| GlyMA | Glycidyl methacrylate |
| 2EHexA | 2-Ethylhexyl acrylate |
| MAA | Methacrylic acid |
| ST | Styrene |
| BuMA | n-Butyl methacrylate |

General working procedure:

450 g of epoxy resin are homogenized at 100° C. with not more than 45 g of monomers (C), and the dispersant from Example II.3) is added at 90° C. 60 g of water are stirred in rapidly at 80° C., 1% by weight (based on monomers) of tert-butyl hydroperoxide is added and the mixture is homogenized for one hour, whilst maintaining it at 65° C. 265 g of water are then added in portions, with the final temperature being 60° C. The mixture is maintained at this temperature and a solution of 1.5% by weight (based on monomers) of ascorbic acid in about 10 g of water (and if appropriate the remaining monomers synchronously) are metered in over the course of 1.5 hours, with slight exothermicity being observed. The batch is allowed to react subsequently at 60° C. for 1.5 h, after which it is adjusted with a little water to about 2500 mPa.s.

The Table shows compositions prepared using this general technique.

TABLE

| Example | Epoxy resin (450 g) | Dispersant (g) | Monomers (g) | NVC (%) | EEM solids (g/mol) | PS (nm) | Viscosity (mPa · s) |
|---|---|---|---|---|---|---|---|
| III.1 | I.2 | 100 II.3 | 45 MMA | 56.2 | 900 | 415 | 2600 |
| III.2 | I.2 | 100 II.3 | 22.5 MMA + 22.5 HEMA | 55.5 | 900 | 544 | 880 |
| III.3 | I.2 | 100 II.3 | 30 MMA + 15 MAA | 53.2 | 900 | 452 | 1200 |
| III.4 | I.2 | 175 II.3 | 45 ST | 58.4 | 1042 | 454 | 2300 |
| III.5 | I.2 | 175 II.3 | 60 MMA + 30 MAA | 60.9 | 1074 | 673 | > 100000 |
| III.6 | I.2 | 175 II.3 | 30 MMA + 15 MAA | 58.0 | 1105 | 440 | 94000 |
| III.7 | I.2 | 175 II.3 | 90 MMA | 60.4 | 1082 | 50 | 7500 |
| III.8 | I.1 | 175 II.3 | 60 MMA + 30 MAA | 55.7 | 1095 | 332 | 6600 |
| III.9 | I.1 | 175 II.3 | 80 MMA + 10 MAA | 54.3 | 1075 | 332 | 9200 |
| III.10 | I.2 | 175 II.3 | 30 MMA + 15 MAA | 50.8 | 1000 | 566 | 3300 |
| III.11 | I.2 | 175 II.3 | 27 MMA + 13.5 MAA + 4.5 BuMA | 52.6 | 956 | 513 | 5500 |
| III.12 | I.2 | 175 II.3 | 27 MMA + 13.5 MAA + 4.5 2EHexMA | 51.2 | 980 | 476 | 2500 |
| III.13 | I.2 | 175 II.3 | 43 MMA + | 51.1 | 1030 | 4690 | 2200 |

TABLE-continued

| Example | Epoxy resin (450 g) | Dispersant (g) | Monomers (g) | NVC (%) | EEM solids (g/mol) | PS (nm) | Viscosity (mPa · s) |
|---|---|---|---|---|---|---|---|
| III.14 | I.2 | 175 II.3 | 22 MAA 57 MMA + 28 MAA | 53.5 | 1110 | 608 | 1000 |
| III.15 | I.2 | 175 II.3 | 22.5 MMA + 22.5 MAA | 46.3 | 1022 | 453 | 3900 |
| III.16 | I.2 | 175 II.3 | 43 MMA + 22 GlyMA | 55.3 | 884 | 659 | 2600 |

Abbreviations:
NVC solids content (1 g, 1 h, 125° C.)
EEM epoxide equivalent mass
PS particle size, photon correlation spectroscopy, monomodal IV. Preparation of the coating compositions according to the invention General working procedure for the formulation of the binders according to the invention:

A solution or dispersion of at least 0.5 mol of the curing component (D) per mole of epoxide groups, in the required quantity of water, is added slowly with thorough stirring to an epoxy-acrylic dispersion according to III., taking into account any carboxyl groups and/or glycidyl groups present in the addition polymer. After thorough homogenization 0.5% by weight of phosphoric acid (as a 50% strength aqueous solution) is stirred in. The heat-curing 1-component coating composition prepared in this way generally has a solids content of approximately 50 to 60%. In this form it can be employed directly as an aqueous clearcoat and was so tested, without further additives, under V. by the standard methods for interior can coatings.

It would be possible subsequently, in addition and if desired, to incorporate homogeneously various additives (E) for defoaming, wetting, improving levelling, pigmentation etc.

V. Applications properties

A 25 μm doctor blade is used to apply thin films to panels of tinplate and/or aluminum which are baked at 200° C. for 12 minutes. The baked film has a dry-film thickness of about 5 μm.

All of the clearcoats obtained from epoxy resin dispersions according to Example III. and using various curing agents (D) in accordance with the general working procedure in IV. form highly crosslinked and thermoformable films of high gloss and good adhesion coupled with very good evenness. The resistance to sterilization and sulfur is good to very good without exception.

The new binders described in accordance with the present invention are thus suitable for unrestricted use not only in beverage cans but also for foodstuffs cans.

VI. Migration tests

For the use of the dispersions according to the invention, a number of typical representatives were applied to Sn or Ag foils under the conditions given in V. and the baked films were extracted with water, 3% acetic acid and 15% ethanol at 121° C. for 30 min and with n-heptane at 65° C. for 2 hours (2 dm$^2$ surface in contact with 400 cm$^3$ of simulation solvent). By evaporating the solvent and determining the residue by gravimetry, the overall migration values (in mg/dm$^2$) were determined, which are markedly below the limiting values of the FDA (7.8 mg/dm$^2$) and the BGA (5.0 mg/dm$^2$), on average about 2–3 mg/dm$^2$. This is also the range for conventional preserve-can interior coatings based on epoxy resin or epoxy-phenolic resin. The dispersions according to the invention thus meet the requirements for preserve-can interior coatings with respect to overall migration. Aqueous systems which conform to the prior art and are also used would not pass this test under the above-mentioned conditions, i.e., they are not resistant to sterilization.

What is claimed is:

1. A process for preparing an aqueous one-component epoxy resin dispersion or two-component epoxy resin dispersion system comprising an epoxy resin which is a condensation product of
(A-1) from 50 to 95% by weight of one or more epoxide compounds having at least two epoxide groups per molecule and an epoxide equivalent mass of from 100 to 2000 g/mol,
(A-2) from 5 to 50% by weight of aromatic polyol, and
(A-3) from 0 to 25% by weight of modifying compounds containing at least two epoxide-reactive groups and which is not classifiable under, (B) a dispersant comprising
(B-1) a condensation product of a polyol having a weight-average molecular mass ($M_w$) of from 200 to 20,000 g/mol and an epoxide compound having on average at least two epoxide groups per molecule and an epoxide equivalent mass of from 100 to 10,000 g/mol, and
(B-2) optional surfactants, (C) a polymer, prepared in a dispersion of (A) in (B), of ethylenically unsaturated monomers which are capable of free-radical polymerization or copolymerization, (D) optionally a curing agent for the epoxy resins, and (E) optional additives and catalysts; comprising the steps of
a) preparing epoxy resin (A) by condensation of components (A-1) and (A-2) and optionally (A-3), in the presence of a condensation catalyst,
b) adding the ethylenically unsaturated monomers which are used to form polymer (C) to the epoxy resin (A),
c) adding dispersant B and water to epoxy resin (A) to produce an aqueous dispersion,
d) polymerizing the monomers added in step b) to give polymer (C),
e) optionally adding curing agent (D) to cure epoxy resins and optionally adding components (E).

2. A process as claimed in claim 1, wherein the dispersion is an aqueous one-component epoxy resin dispersion comprising
(A) an epoxy resin which is a condensation product of
(A-1) from 50 to 95% by weight of one or more epoxide compounds having at least two epoxide groups per molecule and an epoxide equivalent mass of from 100 to 2000 g/mol, (A-2) from 5 to 50% by weight of aromatic polyol, and (A-3) from 0 to 25% by weight of modifying compounds containing at least two epoxide-reactive groups and which is not classifiable under (A-2), (B) a dispersant comprising (B-1) a condensation product of a polyol having a weight-average molecular mass ($M_w$) of from 200 to 20,000 g/mol and an epoxide compound having on average at least two epoxide groups per molecule and an epoxide equivalent mass of from 100 to 10,000 g/mol, and (B-2) optional surfactants, (C) a polymer, prepared in a dispersion of (A) in (B), of ethylenically unsaturated monomers which are capable of free-radical polymerization or copolymerization, (D) a curing agent for the epoxy resins, and (E) optional additives and catalysts.

3. A process as claimed in claim 2, wherein the curing agent (D) comprises one or more of amines, amides, Lewis acids, phenols, carboxylic acids, carboxylic acid anhydrides, phenolic resins, and amino resins.

4. A process as claimed in claim 2, wherein the curing agent (D) comprises one or more compounds which contain carboxyl groups, at least one of these compounds having a functionality of at least three carboxyl groups per molecule.

5. A process as claimed in claim 2, wherein the dispersion is substantially free of amines.

6. A process as claimed in claim 2, wherein component B-2 is present and comprises a nonionic surfactant.

7. A process as claimed in claim 2, wherein component (A-3) is present and comprises a dimeric fatty acid.

8. A process as claimed in claim 1, wherein the polyol of (B-1) comprises a polyether-polyol.

9. A process as claimed in claim 2, wherein the dispersion is substantially free of organic solvents.

10. A process as claimed in claim 2, wherein polymer (C) contains carboxy and/or glycidyl functional groups.

11. A process as claimed in claim 13, wherein the dispersion is an aqueous 2-component epoxy resin dispersion system in which component 2 is an aqueous dispersion comprising an epoxy resin which is a condensation product of (A-1) from 50 to 95% by weight of one or more epoxide compounds having at least two epoxide groups per molecule and an epoxide equivalent mass of from 100 to 2000 g/mol, (A-2) from 5 to 50% by weight of an aromatic polyol, and (A-3) from 0 to 25% by weight of modifying compounds containing at least two epoxide-reactive groups, and which is not classifiable under (A-2)

(B) a dispersant comprising (B-1) a condensation product of a polyol having a weight-average molecular mass ($M_w$) of from 200 to 20,000 g/mol and an epoxide compound having on average at least two epoxide groups per molecule and an epoxide equivalent mass of from 100 to 10,000 g/mol, and (B-2) optional surfactants, (C) a polymer, prepared in a dispersion of (A) in (B), of ethylenically unsaturated monomers which are capable of free-radical polymerization or copolymerization, and (E) optional additives and catalysts, and in which component 2 is a curing agent (D) in a suitable formulation for curing the epoxy resins.

12. A process as claimed in claim 11, wherein the curing agent (D) comprises one or more of amines, amides, Lewis acids, phenols, carboxylic acids, carboxylic acid anhydrides, phenolic resins, and amino resins.

13. A process as claimed in claim 11, wherein the curing agent (D) comprises one or more compounds which contain carboxyl groups, at least one of these compounds having a functionality of at least three carboxyl groups per molecule.

14. A process as claimed in claim 11, wherein the aqueous dispersion is substantially free of organic solvents.

15. A process as claimed in claim 11, where the modifying component A-3 is present and is selected from the group consisting of polyamine, polyoxyalkylenes having terminal amino groups, polycarboxylic acids, and aliphatic polyols.

16. A process as claimed in claim 2, where the modifying component A-3 is present and is selected from the group consisting of polyamine, polyoxyalkylenes having terminal amino groups, polycarboxylic acids, and aliphatic polyols.

17. A process as claimed in claim 2, where the ethylenically unsaturated monomers comprises methyl methacrylate.

18. A process as claimed in claim 2, where the ethylenically unsaturated monomers comprises styrene.

* * * * *

UNITED STATES PATENT AND TRADEMARK OFFICE
CERTIFICATE OF CORRECTION

PATENT NO. : 5,612,394
DATED : March 18, 1997
INVENTOR(S) : Armin PFEIL et al.

It is certified that error appears in the above-identified patent and that said Letters Patent is hereby corrected as shown below:

Column 18, Claim 1, line 24, before "an", insert --(A)--;

line 32, after "under", insert --(A-2)--.

Signed and Sealed this

Thirteenth Day of January, 1998

Attest:

BRUCE LEHMAN

*Attesting Officer*  *Commissioner of Patents and Trademarks*